United States Patent [19]

Allen

[11] Patent Number: 4,784,708

[45] Date of Patent: Nov. 15, 1988

[54] BONDING METHOD OF EMPLOYING GLUABILITY ENHANCEMENT COMPOSITION

[75] Inventor: Robert L. Allen, Park Ridge, Ill.

[73] Assignee: Waldorf Corporation, St. Paul, Minn.

[21] Appl. No.: 872,973

[22] Filed: Jun. 11, 1986

[51] Int. Cl.⁴ .............................................. C09J 5/04
[52] U.S. Cl. ..................................... 156/67; 156/315;
    229/48 T; 524/32; 524/315; 525/166; 525/176;
    525/222
[58] Field of Search .................. 156/67, 315; 525/166,
    525/176, 222; 524/32, 315; 229/48 T

[56] References Cited

U.S. PATENT DOCUMENTS

| 2,268,651 | 1/1942 | Eggert et al. | 524/32 |
| 2,458,104 | 1/1949 | Schweizer | 156/67 |
| 3,321,420 | 5/1967 | Unger | 524/32 |
| 3,819,773 | 6/1974 | Pears | 264/37 |
| 3,865,302 | 2/1975 | Kane | 229/48 T |

OTHER PUBLICATIONS

W. D. Stonecipher & R. W. Turner, "Rosin and Rosin Derivatives", in Herman F. Mark, Ed., *Encyclopedia of Polymer Science and Technology*, vol. 12, pp. 139-161.

J. D. Carlick, "Printing Ink Vehicles", in Herman F. Mark, Ed., *Encyclopedia of Polymer Science and Technology*, vol. 11, pp. 581-586.

Rosin (Colophony) in *Chemical Technology—An Encyclopedic Treatment*, vol. V, pp. 134-145.

Primary Examiner—John J. Gallagher
Attorney, Agent, or Firm—Dorsey & Whitney

[57] ABSTRACT

Gluability of a resin-coated surface of polyester film is enhanced by applying to the surface a composition comprising ethylene vinyl acetate, nitrocellulose and rosin-modified maleic resins.

59 Claims, 1 Drawing Sheet

BONDING METHOD OF EMPLOYING GLUABILITY ENHANCEMENT COMPOSITION

BACKGROUND OF THE INVENTION

1. Field of the Invention

This invention relates to improvements in the manufacture of sealable folding cartons or other containers for food products, consumer goods and the like. More particularly, it relates to a method for improving the gluability of laminated carton blanks having a layer of coated polyester when EVA(ethylene vinyl acetate)-based hot melt adhesives are employed as a sealant for these cartons.

2. Description of the Prior Art

Biaxially oriented polyester film, which exhibits excellent gloss, tensile strength, tear resistant and barrier properties, is frequently used as a substrate for packaging structures which require good barrier protection. The moisture- and gas-barrier properties are further enhanced when a metal layer is applied either by lamination or vacuum metallization. Laminants comprising such metallized polyester bonded to paperboard chipboard are now frequently used to package a wide range of diverse food and consumer products, including dishwashing powder, laundry sanitizer, dentifrice products and powdered soft drinks. Moreover, in the interest of providing tamper evident packaging the major flap can be bonded to the minor flaps of tuck containers.

The surface properties of such commercially-used polyester films provide unsatisfactory printability with inks and unsatisfactory gluability with adhesives commonly utilized in the folding carton industry. As a result, manufacturers of such polyester film have adopted various methods to enhance the ink and adhesive receptivity of their product. Such efforts have included corona discharge treatments of the polyester and application of various coatings to the polyester film. Such coatings include latex resins which impart the high specific surface energy levels necessary for proper wet-out of inks and adhesives, leading to a uniform, continuous film of the applied ink or adhesive. Especially useful are the chemically-primed polyester films sold as Melinex 813 by ICI Americas, Inc. and as Hostaphan 2500 by American Hoechst Corporation. These films are coated on one side with a resinous material designed to enhance printability and gluability.

A typical carton for consumer products based on these polyester coated films is manufactured by the following procedure. The film is metallized on the non-coated side with aluminum via a conventional vacuum metallization technique. The metallized surface is then adhered to paperboard using a casein modified polyvinyl acetate as an adhesive. The coated side of the polyester film is surface printed by a rotogravure process and then overlacquered. The printed product is then die cut into carton blanks. The carton manufacturer's joint is glued on certain unprinted areas with an aqueous copolymer resin adhesive such as, for example, Ajax AC-645-3, available from Ajax Adhesives (Chicago, Ill.). The remaining joints are glued when the carton user performs packaging and filling operations.

With acrylic modified nitrocellulose inks, good ink adhesion is obtained on the chemically coated surface of the polyester film. The chemical coating on this film also enhances, to a certain extent, the gluability of the aqueous copolymer adhesive used in the manufacturer's joint of the folding carton. Although the chemical coating on polyester film such as Melinex 813 and Hostaphan 2500 provides some gluability improvements with respect to aqueous copolymer adhesives, gluability is still unsatisfactory with conventional EVA-based hot melt adhesives that are typically used on the flaps of the cartons joined during packaging and filling operations. Such adhesives are advantageous because their fast setting rate and short compression line requirements permit efficient operation of packaging and filling lines. Due to gluability problems, if one wishes to use a hot melt adhesive, one must resort to rubber-modified adhesives, such as Findley #791-334, available from Findley Adhesives (Elm Grove, Wis.). Such modified adhesives, however, do not "machine" well on conventional packaging and filling machinery. Thus, a need exists for gluability enhancements that work well for conventional EVA-based hot melt adhesives.

Efforts have been directed to developing a satisfactory gluability enhancing composition which could be applied to the appropriate adhering surfaces of polyester-based carton blanks in order to enhance the gluability of EVA-based hot melt adhesives to such blanks. For such development, it is important that the improved gluability be exhibited at a range of ambient temperatures from about 0° F. (−18° C.) to 120° F. (49° C).

A gluability enhancing composition was investigated which consisted of a blend of polyvinyl butyral and polyamide resins in a solvent system consisting of a mixture of ethanol, toluene and aliphatic hydrocarbons; this composition is available under the designation F-92036 from Inmont Corporation (Chicago, Ill.). This gluability coating was applied to the abovementioned metallized Melinex 813/paperboard laminant by a rotogravure process. The gluability coating showed good adhesion to the coated surface of the polyester film and it initially exhibited enhanced gluability with a conventional EVA-based hot melt adhesive (Findley 6301-335). However, bond failure occurred at temperatures of 40° F. (4° C.) and below because of separation of the applied gluability coating and the coated polyester surface.

It is therefore a prime object of this invention to develop a successful method for enhancing the gluability of a resin-coated polyester surface with EVA hot melt adhesives. It is a further object to provide improved polyester film-covered cartons and other containers for foodstuffs, consumer goods and the like which have adequate sealing at ambient temperatures.

SUMMARY OF THE INVENTION

This invention provides a gluability enhancing composition comprising a mixture of ethylene vinyl acetate, nitrocellulose and rosin-modified maleic resins in a suitable solvent. Application of this composition to the resin-coated surface of a polyester film layer laminar structure provides enhanced gluability when conventional EVA-based hot melt adhesives are used to seal the flaps of a carton.

DETAILED DESCRIPTION

The laminated structure to which the subject gluability enhancing composition is applied typically contains a resin-coated polyester film whose coated surface receives printing inks and then is overlacquered. However, the gluability enhancement composition is applied not to the overlacquered, printed areas, but rather to the unprinted flap portions of the carton blank. Thus, said composition is applied directly to the resin-coated surface of the polyester film. Adhering to the uncoated film surface can be one or more additional laminate layers including metallic foil, polyolefins, paper substrate, etc. Typically, for food and consumer goods packaging, the uncoated side of the polyester film will be metallized with aluminum and adhered, via a conventional adhesive, to a paperboard substrate.

Figure 1:
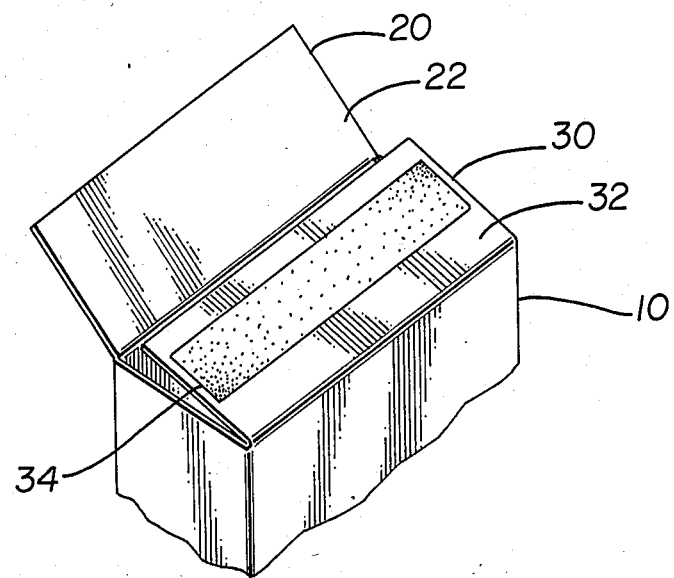
FIG. 1 is a pictorial view of a portion of a carton blank showing the use of the gluability enhancing composition of the present invention.

FIG. 1 shows a typical application in which the end of a coated-polyester laminate paperboard carton 10 is closed and sealed by adhering flaps to each other. Although in a typical tightly sealed carton multiple flaps glued to each other could be used, by way of example, FIG. 1 shows only two flaps 20, 30. Flap 20 is folded onto and glued to previously folded flap 30. The exterior, coated polyester surface 32 of the flap 30 receives the gluability enhancing composition in a defined gluing area 34. The interior surface 22 of the flap 20 is paperboard. Accordingly the fiber side of the flap 20 is joined to the gluing area 34 after the adhesive is applied.

The resin coating layer on the polyester film typically consists of a primer coating comprising a cross-linkable acrylic or methacrylic composition. The cross-linkable acrylic or methacrylic compositions are polymers or copolymers of acrylic acid or methacrylic acid or their esters or amides containing functional groups, such as hydroxy, carboxyl, amide and oxirane groups, desirably including a suitable cross-linking catalyst, e.g. ammonium chloride. Preferably such a composition also includes a condensation product of an amine, such as melamine, urea and diazines or their derivatives, with formaldehyde, which may be alkylated. A suitable composition is based on an ethyl acrylate/methyl methacrylate/methacrylamide copolymer and an ethylated amine/formaldehyde condensate. The coating may be applied from an aqueous or organic medium, but preferably as an aqueous dispersion.

Two specific examples of successfully-used aqueous coatings (from U.S. Pat. No. 3,819,773 which is incorporated herein in its entirety by reference thereto) are given below, parts being calculated by weight.

| | Parts |
|---|---|
| Example I | |
| Thermosetting acrylic composition based on polyethyl acrylate and an amine/formaldehyde condensate | 9.5 |
| Poly(ethylene oxide-propylene oxide) emulsifier | 0.3 |
| Ammonia 4% aqueous solution | 0.2 |
| Water | 90 |
| Example II | |
| Cross-linkable acrylic composition comprising 87% by weight of copolymer of ethyl acrylate, methyl methacrylate and methacrylamide (45%, 50% and 5% by weight) and 13% by weight of ethylated melamine formaldehyde | 9.6 |
| Poly(ethylene oxide-propylene oxide) emulsifier | 0.3 |
| Ammonium chloride (catalyst) | 0.1 |
| Water | 90 |

The resin coating composition is typically applied to a substantially amorphous polyester film prior to orientation such that when the film is biaxially oriented at commonly applied draw ratios, the final coating thickness will be at least $10^{-7}$ inch. Further details of such coating and film can be found in U.S. Pat. No. 3,819,773.

The gluability enhancing composition useable in this invention is a mixture of about 5 to 15% by weight nitrocellulose, 5 to 10% by weight ethylene vinyl acetate and 5 to 10% by weight rosin-modified maleic resins. (The nitrocellulose may be about 18-25 centipoise viscosity, RS or SS grade nitrocellulose, preferably RS grade. The ethylene vinyl acetate is preferably a minimum of 40% by weight vinyl acetate. The rosin modified maleic resins may be any non-alcohol soluble rosin-modified maleic resin and is preferably one having a melting point of about 138°-146° C.) The preceding composition is dissolved in an appropriate solvent system in which all three elements of the composition are soluble, such that the solids become flowable and the solvents will evaporate under printing conditions. For example, a solvent system comprising esters and aromatic solvents at a total solids concentration in the range of 20-30% by weight would be suitable.

Especially useful for rotogravure application to the treated surface of Melinex 813 is a composition sold under the designation AJC-11677 by Thiele-Engdahl (Addison, Ill.), which contains:

| Component | % By Weight |
|---|---|
| Nitrocellulose | 7.7 |
| Ethylene vinyl acetate | 7.7 |
| Rosin-modified maleic resin | 7.7 | in a solvent system comprising 60% isopropyl acetate and 40% toluene by weight.

The gluability enhancing composition can be applied conveniently in line during the carton blank manufacturing process. Alternatively, it can be applied during the carton filling process, but care should be taken that the solvents are evaporated prior to the sealing step. The composition is applied only to the flap areas (gluing areas) where adhesion is desired. The composition may be applied by use of an etched rotogravure cylinder or by use of a flexographic printing method, leading to a dry solids deposit of 0.20-0.35 lbs. per thousand square feet.

The application of these gluability enhancing compositions permits the carton filler to employ hot melt adhesives other than the rubber-modified varieties and still obtain a seal that will not fail in ambient temperature ranges. EVA hot melt adhesives are advantageous because their fast setting rate and short compression line requirements permit efficient operation of packaging and filling lines. EVA hot melt adhesives can be applied by wheel, nozzle or extrusion. To form a joint the hot melt adhesive is applied to the gluing area of one flap to which the gluability enhancing composition has already been applied. This flap is then mated with the corresponding gluing area of another flap (or other surface), which is either the fiber side of paperboard or, if it has a resin coated film, has also already received the gluability enhancing composition.

The EVA hot melt adhesives with which the invention is concerned consist of a mixture of 30-40% by weight EVA with approximately equal parts of parafin and a tackifier resin comprising the remainder. The EVA comprises 17-30% vinyl acetate by weight. The preferred embodiment comprises about one-third (by weight) of each of the parafin, tackifier resin and EVA (comprising 17-30% vinyl acetate by weight).

In its preferred embodiment, the composition of the present invention is transparent. This makes it difficult to determine visually or by photosensing means proper registration of the composition on relatively small gluing areas, particularly when processing cartons on high-speed equipment. To aid in determining proper registration, small amounts of white ink can be added to permit photodetection. Still more advantageous is the addition of an ultraviolet (UV) fluorescent agent, so that registration can be monitored under a UV lamp. In particular, the above AJC-11677 composition can be enhanced by addition of a UV fluorescent agent in small amounts, e.g., 0.01% by weight of Uvitex OB.

Figure 2:
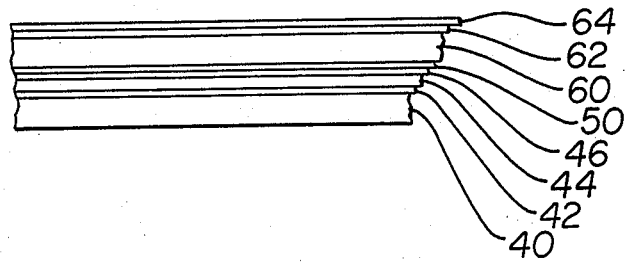
FIG. 2 is a cross-sectional view of two resin-coated polyester film laminated surfaces to one of which the gluability enhancing composition has been applied and which have thereafter been joined with an EVA hot melt adhesive.

FIG. 2 shows a cross-sectional view of a typical glue joint between two carton flaps (or other surfaces) utilizing the present invention. The inner (lower) flap consists of a paperboard layer 40 on which a polyester film layer 42, typically metallized with a thin layer of aluminum (not shown), is laminated. The polyester film 42 is coated with a resin coating 44 to which the gluability enhancing composition 46 is applied. A layer of EVA hot-melt adhesive 50 is applied to the area treated with the gluability enhancing composition 46. The adhesive 50 bonds to the fiber side of another layer of paperboard 60 having a polyester film layer 62 with a resin coating 64 on its opposite side.

This invention will be better understood by reference to the following example, which is here included for illustrative purposes only and should not be construed as a limitation.

EXAMPLE

Samples of 48 gauge Melinex 813, metallized on the non-treated side by the conventional vacuum metallization process, were obtained and laminated to 0.030" bending chipboard using casein modified polyvinyl acetate as the adhesive. The laminated structure was cut into pieces approximately 4"×12" in which the paperboard grain was in the 12" direction. Twelve samples each were coated on the Melinex 813 surface with AJC-11677 using a Geiger rotogravure proof press with 150 and 120 line screen cylinders. This produced dry coating weights of approximately 0.20 and 0.35 lbs./thousand square feet respectively.

The coated laminant was cut into strips approximately 1"×4" in which the paperboard grain was in the 4" direction. Also, for control purposes, samples of the uncoated laminant were cut into strips of a like size.

Hot melts were applied to the strips by means of a laboratory hot melt gun at an application temperature of approximately 350° F. The adhesives were applied to the Melinex 813 surface in the form of a continuous liquid bead measuring ⅛"×3" and rapidly mated to the fiber side of a second strip. The bonded specimens were compressed for approximately 2 seconds with a hand held, 10 pound steel roller.

For the samples previously coated with AJC-11677, either at the 0.20 or 0.35 lbs./thousand square feet level, the adhesive was a conventional EVA-based hot melt. More specifically, the coated strips were adhered with Findley 6301-335. For control purposes the uncoated strips were adhered with a rubber modified hot melt, namely Findley 791-334.

A minimum of six bonded strips each of the three variables were placed in laboratory environmental cabinets maintained at 0° F., 40° F. and 120° F. The test specimens were allowed to condition for 16 hours and then removed and rapidly separated by hand by pulling the strips in a direction of 180° to each other. All bonds were characterized by 100% fiber tear.

In summary, the composition of the present invention can be applied to the glue flap surfaces of laminated carton blanks having a layer of coated polyester to enhance gluability with EVA-based hot melts. It will be seen by a person skilled in the art that the invention would be applicable not only to cartons but also to bags, flexible package components, sleeves or other containers and to display units or school folders in which a glue-joint is necessary involving one or more surfaces having a layer of resin-coated polyester or still further header cards where a solid object is bonded to the metallized paper board laminant. Also, it will be seen that various minor modifications of the invention disclosed may be made that are still within the scope and spirit of the invention. Accordingly, the invention is not to be limited by the above disclosure, but rather by the appended claims.

What is claimed as new and desired to be protected by Letters Patent is:

1. A method of enhancing the gluability of ethylene-vinyl acetate hot melt adhesives applied to a resin-coated surface of a polyester film which comprises applying to the surface a gluability enhancing composition comprising ethylene vinyl acetate, nitrocellulose and rosin-modified maleic resin.

2. A method according to claim 1 in which the gluability enhancing composition further comprises isopropyl acetate and toluene.

3. A method according to claim 1 in which the gluability enhancing composition further comprises a UV fluorescent agent.

4. A method according to claim 1 in which the resin-coated surface is coated with a resin comprising a composition selected from the group consisting of cross-linkable acrylic compositions, cross-linkable methacrylic compositions and cross-linkable acrylic-methacrylic compositions.

5. A method according to claim 4 in which the resin used to coat the surface further comprises a condensation product of an amine with formaldehyde.

6. A method according to claim 5 wherein the amine is melamine, urea or diazines or their derivatives.

7. A method according to claim 5 wherein the amine formaldehyde condensation product may be alkylated.

8. A method according to claim 4 wherein the cross-linkable acrylic composition and the methacrylic composition are polymers of acrylic acid and methacrylic acid or their esters or amides respectively and the cross-linkable acrylic-methacrylic composition is a copolymer of acrylic acid and methacrylic acid or their esters or amides, all of the foregoing containing functional groups.

9. A method according to claim 1 in which the rosin-modified maleic resin is a non-alcohol soluble rosin-modified maleic resin.

10. A method according to claim 1 in which the gluability enhancing composition comprises 5 to 15% by weight nitrocellulose, 5 to 10% by weight ethylene vinyl acetate and 5 to 10% by weight rosin-modified maleic resin.

11. A method according to claim 10 in which the gluability enhancing composition further comprises esters and aromatic solvents in the range of 70 to 80% by weight.

12. A method according to claim 10 in which the gluability enhancing composition comprises 7.7% by weight of each of the nitrocellulose, ethylene vinyl acetate and rosin-modified maleic resin, which are dissolved in a solvent comprising by weight 60% isopropy acetate and 40% toluene.

13. A method according to claim 10 in which the gluability enhancing composition further comprises a UV fluorescent agent to aid proper registration.

14. A method according to claim 10 in which the resin-coated surface is coated with a resin comprising a composition selected from the group consisting of cross-linkable acrylic compositions, cross-linkable methacrylic compositions and cross-linkable acrylic-methacrylic compositions.

15. A method according to claim 14 in which the resin used to coat the surface further comprises a condensation product of an amine with formaldehyde.

16. A method according to claim 15 wherein the amine is melamine, urea or diazines or their derivatives.

17. A method according to claim 15 wherein the amine formaldehyde condensation product may be alkylated.

18. A method according to claim 14 wherein the cross-linkable acrylic composition and the methacrylic composition are polymers of acrylic acid and methacrylic acid or their esters or amides respectively and the cross-linkable acrylic-methacrylic composition is a copolymer of acrylic acid and methacrylic acid or their esters or amides, all of the foregoing containing functional groups.

19. A method according to claim 10 in which the rosin-modified maleic resin is a non-alcohol soluble rosin-modified maleic resin.

20. A method of binding a resin-coated surface of a polyester film to a second surface using ethylene-vinyl acetate hot melt adhesives comprising:
applying to a gluing area of the resin-coated surface a gluability enhancing composition comprising ethylene vinyl acetate, nitrocellulose, and rosin-modified maleic resins;
applying to the gluing area over the gluability enhancing composition the ethylene-vinyl acetate hot melt adhesive; and
mating the second surface and the resin-coated surface.

21. The method according to claim 20 in which gluability enhancing composition is applied by a rotogravure cylinder.

22. The method according to claim 20 in which the ethylene-vinyl acetate hot melt adhesive is applied by extruder application.

23. A method according to claim 20 in which the gluability enhancing composition further comprises isopropyl acetate and toluene.

24. A method according to claim 20 in which the gluability enhancing composition further comprises a UV fluorescent agent to aid proper registration.

25. A method according to claim 20 in which the resin-coated surface is coated with a resin comprising a composition selected from the group consisting of cross-linkable acrylic compositions, cross-linkable methacrylic compositions and cross-linkable acrylic-methacrylic compositions.

26. A method according to claim 25 in which the resin used to coat the surface further comprises a condensation product of an amine with formaldehyde.

27. A method according to claim 26 wherein the amine is melamine, urea or diazines or their derivatives.

28. A method according to claim 26 wherein the amine formaldehyde condenstaion product may be alkylated.

29. A method according to claim 26 wherein the cross-linkable acrylic composition and the methacrylic composition are polymers of acrylic acid and methacrylic acid or their esters or amides respectively and the cross-linkable acrylic-methacrylic composition is a copolymer of acrylic acid and methacrylic acid or their esters or amides, all of the foregoing containing functional groups.

30. A method according to claim 20 in which the rosin-modified maleic resin is a non-alcohol soluble rosin-modified maleic resin.

31. A method according to claim 20 in which the gluability enhancing composition comprises 5 to 15% by weight nitrocellulose, 5 to 10% by weight ethylene vinyl acetate and 5 to 10% by weight rosin-modified maleic resin.

32. A method according to claim 31 in which the gluability enhancing composition further comprises esters and aromatic solvents in the range of 70 to 80% by weight.

33. A method according to claim 31 in which the gluability enhancing composition comprises 7.7% by weight of each of the nitrocellulose, ethylene vinyl acetate and rosin-modified maleic resin, which are dissolved in a solvent comprising by weight 60% isopropyl acetate and 40% toluene.

34. A method according to claim 31 in which the gluability enhancing composition further, comprises a UV fluorescent agent to six proper registration.

35. A method according to claim 31 in which the resin-coated surface is coated with a resin comprising a composition selected from the group consisting of cross-linkable acrylic compositions, cross-linkable methacrylic compositions and cross-linkable acrylic-methacrylic compositions.

36. A method according to claim 35 in which the resin used to coat the surface further comprises a condensation product of an amine with formaldehyde.

37. A method according to claim 35 wherein the amine is melamine, urea or diazines or their derivatives.

38. A method according to claim 35 wherein the amine formaldehyde condensation product may be alkylated.

39. A method according to claim 34 wherein the cross-linkable acrylic composition and the methacrylic composition are polymers of acrylic acid and methacrylic acid or their esters or amides respectively and the cross-linkable acrylic-methacrylic composition is a copolymer of acrylic acid and methacrylic acid or their esters or amides, all of the foregoing containing functional groups.

40. A method according to claim 31 in which the rosin-modified maleic resin is a non-alcohol soluble rosin-modified maleic resin.

41. A container having one or more joints formed by joining two mating surfaces with ethylene-vinyl acetate hot melt adhesive wherein at least one of the surfaces joined is a resin-coated surface of a polyester film to which a gluability enhancing composition comprising ethylene vinyl acetate, nitrocellulose and rosin modified maleic resins has been applied.

42. A container according to claim 41 in which the gluability enhancing composition further comprises isopropyl acetate and toluene.

43. A container according to claim 41 in which the gluability enhancing composition further comprises a UV fluorescent agent to aid proper registration.

44. A container according to claim 41 in which the resin-coated surface is coated with a resin comprising a composition selected from the group consisting of cross-linkable acrylic compositions, cross-linkable methacrylic compositions and cross-linkable acrylic-methacrylic compositions.

45. A container according to claim 44 in which the resin used to coat the surface further comprises a condensation product of an amine with formaldehyde.

46. A container according to claim 45 wherein the amine is melamine, urea or diazines or their derivatives.

47. A container according to claim 45 wherein the amine formaldehyde condensation product may be alkylated.

48. A container according to claim 44 wherein the cross-linkable acrylic composition and the methacrylic composition are polymers of acrylic acid and methacrylic acid or their esters or amides respectively and the cross-linkable acrylic-methacrylic composition is a copolymer of acrylic acid and methacrylic acid or their esters or amides all of the foregoing containing functional groups.

49. A container according to claim 41 in which the rosin-modified maleic resin is a non-alcohol soluble rosin-modified maleic resin.

50. A container according to claim 41 in which the gluability enhancing composition comprises 5 to 15% by weight nitrocellulose, 5 to 10% by weight ethylene vinyl acetate and 5 to 10% by weight rosin-modified maleic resin.

51. A container according to claim 50 in which the gluability enhancing composition further comprises esters and aromatic solvents in the range of 70 to 80% by weight.

52. A container according to claim 50 in which the gluability enhancing composition comprises 7.7% by weight of each of the nitrocellulose, ethylene vinyl acetate and rosin-modified maleic resin, which are dissolved in a solvent comprising by weight 60% isopropyl acetate and 40% toluene.

53. A container according to claim 50 in which the gluability enhancing composition further comprises a UV fluorescent agent to aid proper registration.

54. A container according to claim 50 in which the resin-coated surface is coated with a resin comprising a composition selected from the group consisting of cross-linkable acrylic compositions, cross-linkable methacrylic compositions and cross-linkable acrylic-methacrylic compositions.

55. A container according to claim 54 in which the resin used to coat the surface further comprises a condensation product of an amine with formaldehyde.

56. A container according to claim 55 wherein the amine is melamine, urea or diazines or their derivatives.

57. A container according to claim 55 wherein the amine formaldehyde may be alkylated condensation product.

58. A container according to claim 54 wherein the cross-linkable acrylic composition and the methacrylic composition are polymers of acrylic acid and methacrylic acid or their esters or amides respectively and the cross-linkable acrylic-methacrylic composition is a copolymer of acrylic acid and methacrylic acid or their esters or amides, all of the foregoing containing functional groups.

59. A container according to claim 50 in which the rosin-modified maleic resin is a non-alcohol soluble rosin-modified maleic resin.

* * * * *